United States Patent
Gregg et al.

(10) Patent No.: US 10,514,083 B2
(45) Date of Patent: Dec. 24, 2019

(54) CROSS-LINKED ELASTOMERIC LOW FRICTION FACED SYNCHRONOUS POWER TRANSMISSION BELT

(71) Applicant: ContiTech Antriebssysteme GmbH, Hannover (DE)

(72) Inventors: Michael Gregg, Lincoln, NE (US); Jeffery Lofgren, Lincoln, NE (US)

(73) Assignee: ContiTech Antriebssysteme GmbH, Hannover (DE)

( * ) Notice: Subject to any disclaimer, the term of this patent is extended or adjusted under 35 U.S.C. 154(b) by 0 days.

(21) Appl. No.: 15/237,665

(22) Filed: Aug. 16, 2016

(65) Prior Publication Data
US 2018/0051772 A1    Feb. 22, 2018

(51) Int. Cl.
| | |
|---|---|
| *F16G 1/10* | (2006.01) |
| *F16G 1/28* | (2006.01) |
| *F16G 5/08* | (2006.01) |
| *F16G 5/20* | (2006.01) |
| *B29C 45/16* | (2006.01) |
| *B29D 29/08* | (2006.01) |

(52) U.S. Cl.
CPC ............ *F16G 1/28* (2013.01); *B29C 45/1642* (2013.01); *B29D 29/08* (2013.01); *F16G 1/10* (2013.01); *F16G 5/08* (2013.01); *F16G 5/20* (2013.01)

(58) Field of Classification Search
CPC ..... F16G 1/28; F16G 5/20; F16G 1/10; C08G 18/12; B29D 29/08
USPC ........................................................ 474/205
See application file for complete search history.

(56) References Cited

U.S. PATENT DOCUMENTS

| | | | | |
|---|---|---|---|---|
| 2,805,182 | A * | 9/1957 | Hallenbeck ............. | B32B 27/00 152/564 |
| 3,894,900 | A * | 7/1975 | Redmond, Jr. ........ | B29D 29/08 156/138 |
| 3,911,755 | A * | 10/1975 | Vance, Sr. ................ | F16G 1/10 474/262 |
| 3,937,094 | A * | 2/1976 | Cicognani ................ | F16G 1/28 474/205 |

(Continued)

FOREIGN PATENT DOCUMENTS

| | | |
|---|---|---|
| DE | 102007061735 A1 | 7/2009 |
| GB | 2349113 A | 10/2000 |
| WO | 2015166457 A1 | 11/2015 |

*Primary Examiner* — Henry Y Liu

(57) ABSTRACT

A synchronous drive belt includes an outer tension section and opposing continuous tooth section defining an outer surface. The synchronous drive belt further includes a cross-linked elastomeric body, and a tensile reinforcement section disposed between the outer tension section and the cross-linked elastomeric body. A fabric reinforcement is disposed inwardly adjacent the outer surface of the continuous tooth section, and the fabric reinforcement is enveloped by the cross-linked elastomeric body. Further, the cross-linked elastomeric body forms the outer surface of the continuous tooth section. In some aspects, the cross-linked elastomeric body contains a urethane material, which may be formed from the reaction product of a polyisocyanate and a hydroxyl functional polyol during a belt molding process. The polyisocyanate and the hydroxyl functional polyol may envelop the fabric reinforcement prior to reacting during the belt molding process, or even while reacting in the molding process.

16 Claims, 1 Drawing Sheet

(56) References Cited

U.S. PATENT DOCUMENTS

| | | | | |
|---|---|---|---|---|
| 3,964,328 A * | | 6/1976 | Redmond, Jr. | B29D 29/08 156/139 |
| 4,099,422 A * | | 7/1978 | Cicognani | B32B 25/10 474/205 |
| 4,392,842 A * | | 7/1983 | Skura | F16G 1/28 474/205 |
| 4,627,828 A * | | 12/1986 | Nagai | F16G 1/28 474/205 |
| 4,632,665 A * | | 12/1986 | Skura | F16G 1/28 474/205 |
| 4,895,555 A * | | 1/1990 | Watanabe | B29C 45/14631 474/260 |
| 5,064,340 A * | | 11/1991 | Genov | B25J 9/042 414/744.5 |
| 5,244,436 A * | | 9/1993 | Kurokawa | F16G 5/20 474/260 |
| 5,322,479 A * | | 6/1994 | Le Devehat | F16G 1/28 474/101 |
| 5,362,281 A * | | 11/1994 | Dutton | F16G 1/28 474/205 |
| 5,427,728 A * | | 6/1995 | Beck | B29D 29/08 156/140 |
| 5,478,286 A * | | 12/1995 | Hamano | F16G 1/28 474/205 |
| 5,645,504 A * | | 7/1997 | Westhoff | F16G 1/28 474/250 |
| 5,741,197 A * | | 4/1998 | Akita | B29D 29/08 474/268 |
| 5,971,879 A * | | 10/1999 | Westhoff | B32B 5/26 442/35 |
| 6,296,588 B1 * | | 10/2001 | Ciemniecki | B29D 29/08 474/268 |
| 6,352,488 B1 * | | 3/2002 | Morris | F16G 1/28 474/260 |
| 6,419,775 B1 * | | 7/2002 | Gibson | B32B 25/10 156/137 |
| 7,025,699 B2 * | | 4/2006 | Beck | F16G 1/08 156/137 |
| 7,041,021 B2 * | | 5/2006 | Gibson | B32B 25/10 156/139 |
| 7,217,210 B2 * | | 5/2007 | Wood | F16G 1/08 474/260 |
| 7,749,118 B2 * | | 7/2010 | Baldovino | F16G 1/28 474/205 |
| 7,780,560 B2 * | | 8/2010 | Lofgren | F16G 1/10 156/139 |
| 7,824,288 B2 * | | 11/2010 | Wu | C08G 18/12 474/268 |
| 7,909,720 B2 * | | 3/2011 | Burrowes | F16G 1/28 474/205 |
| 8,262,522 B2 * | | 9/2012 | Dieudonne | F16G 5/20 474/205 |
| 8,357,065 B2 * | | 1/2013 | Duke, Jr. | B29D 29/08 474/205 |
| 8,932,165 B2 * | | 1/2015 | Knox | F16G 1/28 474/202 |
| 9,388,879 B2 * | | 7/2016 | Takaba | F16G 5/20 |
| 2002/0015825 A1 * | | 2/2002 | Meco | F16G 1/28 428/172 |
| 2002/0179228 A1 * | | 12/2002 | Gibson | B32B 25/10 156/139 |
| 2006/0174997 A1 * | | 8/2006 | Gibson | B32B 25/10 156/139 |
| 2007/0213157 A1 * | | 9/2007 | Noda | B65H 5/025 474/237 |
| 2007/0281814 A1 * | | 12/2007 | Baldovino | F16G 1/28 474/205 |
| 2008/0004145 A1 * | | 1/2008 | Duke | B29D 29/08 474/205 |
| 2009/0227406 A1 * | | 9/2009 | Wu | C08G 18/12 474/238 |
| 2010/0004082 A1 * | | 1/2010 | Di Meco | B32B 3/28 474/205 |
| 2010/0075793 A1 * | | 3/2010 | Cretin | F16G 1/10 474/205 |
| 2011/0269588 A1 * | | 11/2011 | Fleck | F16G 1/10 474/205 |
| 2011/0269589 A1 * | | 11/2011 | Schleicher | F16G 1/28 474/205 |
| 2013/0059690 A1 * | | 3/2013 | Di Cesare | F16G 1/08 474/205 |
| 2013/0085028 A1 * | | 4/2013 | Yamada | F16G 5/08 474/263 |
| 2014/0073468 A1 * | | 3/2014 | Knutson | F16G 5/08 474/260 |
| 2014/0262696 A1 * | | 9/2014 | Gibson | F16G 1/10 198/847 |
| 2015/0259176 A1 * | | 9/2015 | Goeser | B66B 7/062 428/189 |

* cited by examiner

CROSS-LINKED ELASTOMERIC LOW FRICTION FACED SYNCHRONOUS POWER TRANSMISSION BELT

FIELD

The field to which the disclosure generally relates to are textile-reinforced power transmission belts with a polyurethane body, and specifically to improved belts with polyurethane bodies where the polyurethane body is cross-linked in manufacture of the belt and at least partially embeds a tooth fabric reinforcement.

BACKGROUND

This section provides background information to facilitate a better understanding of the various aspects of the disclosure. It should be understood that the statements in this section of this document are to be read in this light, and not as admissions of prior art.

Synchronous drive belts are primarily used as power transmission belts. In this use, the teeth of the synchronous drive belts engage between the teeth of an opposite belt or of a toothed disc to effect power transmission. Synchronous drive belts are often used in synchronous or positive drives, for example to provide synchronization between two or more rotating shafts.

Synchronous drive belts are frequently standard rubber toothed belts having, in general, a rearward region, a toothed front region and an interposed tensile layer based on, for example, steel or glass cord. The toothed front region frequently includes a vulcanizate based on HNBR, that is, a hydrogenated acrylonitrile-butadiene rubber copolymer, which customarily includes fillers. The mechanical and thermal resistance demands on such belts increase with increases in the power levels of the machines in which they are used. Long durability and high mechanical resistance over a broad service temperature range are therefore indispensable.

To enhance the mechanical stability of toothed belt teeth, the surfaces of the teeth may be provided with a covering, which is generally continuous and completely covers the crests, flanks and roots of the teeth. This covering can include a coating of, for example, a modified vulcanizate, or it can preferably be formed from a knitted or woven fabric. In some application, woven polyamide 6,6 stretch fabric has proved very useful for this purpose in that it has good mechanical properties and good adhesion to the tooth rubber.

In high performance synchronous drive belts a facing fabric is typically formed by viscous elastomer during the cure process, or in the case of cast polyurethane belts the layer of fabric is covered in a layer of thermoplastic polyethylene which is preformed with a heat and cool molding process, and applied to the belt mold. The facing fabric covering the toothed side of the belt helps both reinforcing the tooth, and provides a low friction wear resistant surface to engage pulleys. In use, the thermoplastic polyethylene may be prone to cold flow during service away from the loaded areas. Cold flow is the tendency of a solid material to move slowly or deform permanently under the influence of mechanical stresses. It can occur as a result of long-term exposure to high levels of stress that are still below the yield strength of the material. Cold flow is more severe in materials that are subjected to heat for long periods, and generally increases as they near their melting point.

As drive systems, such as the motor vehicles, are being equipped with more and more powerful engines or motors, and engines or motors are more and more completely enclosed to reduce noise, synchronous drive belts are exposed to ever higher operating temperatures. Thus, there exists a need for materials forming synchronous drive belts teeth which provide superior and long-term high temperature resistance and durability, such need met at least in part, with the following disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a synchronous drive belt is provided, which includes an outer tension section and opposing continuous tooth section defining an outer surface. The synchronous drive belt further includes a cross-linked elastomeric body, and a tensile reinforcement section disposed between the outer tension section and the cross-linked elastomeric body. A fabric reinforcement is disposed inwardly adjacent the outer surface of the continuous tooth section, and the fabric reinforcement is enveloped by the cross-linked elastomeric body. Further, the cross-linked elastomeric body forms the outer surface of the continuous tooth section. In some aspects, the cross-linked elastomeric body contains a urethane material, which may be formed from the reaction product of a polyisocyanate and a hydroxyl functional polyol during a belt molding process. In some aspects, the polyisocyanate and the hydroxyl functional polyol are subject to a temperature of from about 80° C. to about 120° C. during a belt molding process.

The polyisocyanate and the hydroxyl functional polyol may envelop the fabric reinforcement prior to reacting during the belt molding process, or even while reacting in the molding process. The polyisocyanate and the hydroxyl functional polyol may injected into a belt mold and reacted during a belt molding process, in a method process where the belt mold contains the outer tension section, the tensile reinforcement section and the fabric reinforcement prior to injecting the polyisocyanate and the hydroxyl functional polyol.

The fabric reinforcement may be based upon one or more materials selected from cotton, polyester, polyamide, polyacrylic, polyaramid, nylon, polyketone, polyarylene sulfide, hemp, jute or fiberglass. The tensile reinforcement section may include cords formed from one or more materials selected from cotton, rayon, nylon, polyester, aramid, steel, carbon, and poly(p-phenylene-2,6-benzobisoxazole (PBO).

In some aspects, the outer tension section includes one or more materials selected from chloroprene rubber ("CR"), acrylonitrile butadiene rubber ("NBR"), hydrogenated NBR ("HNBR"), styrene-butadiene rubber ("SBR"), alkylated chlorosulfonated polyethylene ("ACSM"), epichlorohydrin, butadiene rubber ("BR"), natural rubber ("NR"), ethylene propylene terpolymer ("EPDM") and ethylene propylene copolymer ("EPM").

In another embodiment of the disclosure, a synchronous drive belt includes an outer tension section and opposing continuous tooth section defining an outer portion. The synchronous drive belt also includes a cross-linked elastomeric body based upon a urethane material formed from the reaction product of a diisocyanate and a hydroxyl functional polyether, and a tensile reinforcement section disposed between the outer tension section and the cross-linked elastomeric body. A fabric reinforcement is included as part of the outer portion of the continuous tooth section, and the fabric reinforcement is at least partially embedded in the cross-linked elastomeric body. In some aspects, the cross-linked elastomeric body envelops the fabric reinforcement and forms the outer surface of the continuous tooth section.

The diisocyanate and the hydroxyl functional polyether may be reacted during a belt molding process. Further, the diisocyanate and the hydroxyl functional polyether may injected into a belt mold and reacted during a belt molding process, where the belt mold contains the outer tension section, the tensile reinforcement section and the fabric reinforcement prior to injecting the diisocyanate and the hydroxyl functional polyether.

Yet another aspect of the disclosure are methods which include placing an outer tension section, a tensile reinforcement section and a fabric reinforcement into a belt mold, where the outer tension section and the fabric reinforcement define opposing surfaces. The tensile reinforcement section is disposed adjacent the outer tension section. A cross-linkable composition is injected into the belt mold between the outer tension section and the fabric reinforcement, and then the cross-linkable composition is reacted, or otherwise cured, to form a synchronous drive belt comprising a cross-linked elastomeric body. In some cases, the fabric reinforcement is at least partially embedded in the cross-linked elastomeric body. The fabric reinforcement may even be enveloped by the cross-linked elastomeric body.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
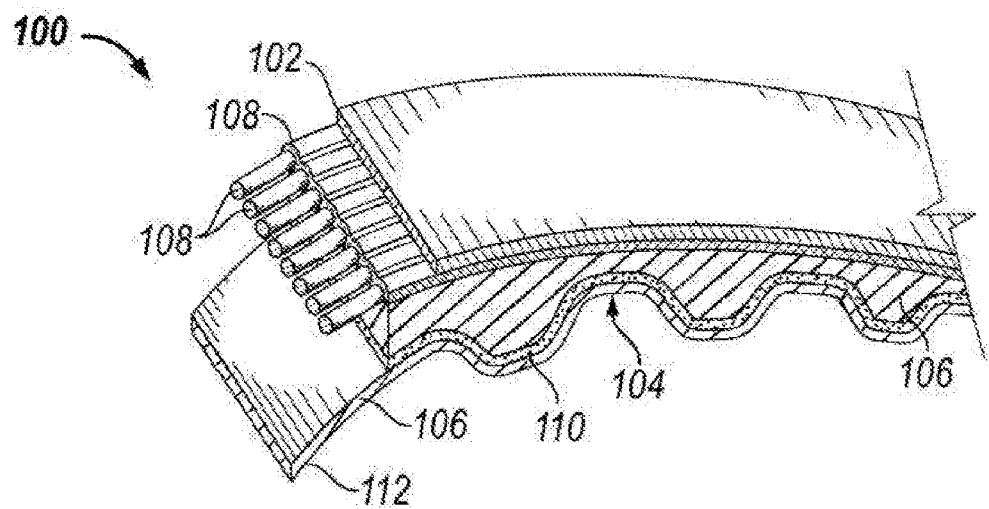
FIG. 1 illustrates a synchronous drive belt in accordance with an aspect of the disclosure, in a fragmented perspective view; and, FIG. 2 depicts another synchronous drive belt in accordance with another aspect of the disclosure, in a fragmented perspective view.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the materials used in the present disclosure are described herein as comprising certain components, it should be understood that the materials could optionally comprise two or more chemically different materials. In addition, the materials can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value, concentration and/or amount range listed or described as being useful, suitable, or the like, is intended that any and every point within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments of the disclosure are synchronous drive belts, which contain compounds and materials providing the belts with improved properties in regards to belt growth, wicking, abrasion, cold flow resistance, temperature resistance and durability. Such belts have an outer tension section and an opposing continuous tooth section defining an outer surface, and a cross-linked elastomeric body. A tensile reinforcement section is disposed between the outer tension section and the cross-linked elastomeric body. In some embodiments, a fabric reinforcement is disposed inwardly adjacent the outer surface of the continuous tooth section and the fabric reinforcement is enveloped by the cross-linked elastomeric body, such that the cross-linked elastomeric body forms the outer surface of the continuous tooth section. In some other embodiments, the fabric reinforcement is part of the outer portion of the continuous tooth section and at least partially embedded in the cross-linked elastomeric body.

In some embodiments, the elastomeric body contains a cross-liked urethane material, which in some aspects, is formed of a reaction of a polyisocyanate with a polyol at sufficient temperature, such as from about 80° C. to about 120° C. In some embodiments, the urethane material is formed from the reaction product of a diisocyanate and a hydroxyl functional polyether. In some cases, a diisocyanate and a hydroxyl functional polyether are reacted during a belt molding process. Some non-limiting examples of polyisocyanates useful for forming the cross-liked urethane elastomeric body include compact, symmetric aromatic diisocyanates, including but not limited to p-phenylene diisocyanate (PPDI), 1,5-naphthalene diisocyanate (NDI), and 2,6-toluene diisocyanate (2,6-TDI). Other polyisocyanates useful as starting components for forming the cross-liked urethane elastomeric body include cycloaliphatic diisocyanates with trans or trans,trans geometric configuration. These isomers are generally pure, i.e., they exist in the substantial absence of cis-configured isomers, and thus promote good phase separation once cured. These include but are not limited to t-CHDI, and trans,trans-4,4'-dicyclohexylmethyl diisocyanate (t,t-HMDI).

In forming the elastomeric body containing a cross-liked urethane material, polyisocyanate is reacted with a polyol having pendant hydroxyl functional groups during the belt molding, or otherwise manufacturing, process. The polyol may be any suitable polyol useful in forming a urethane material. In some aspects, the polyols are polyether polyols, which are made by the reaction of epoxides with an active hydrogen containing compound. In some other cases, the polyols are polyester polyols which are made by the polycondensation of multifunctional carboxylic acids and polyhydroxyl compounds. They can be further classified according to their end use. Higher molecular weight polyols (i.e. number average molecular weights from 2,000 to 10,000) are used to make more flexible polyurethanes while lower molecular weight polyols make more rigid products. In general, polyols useful in embodiments according to the disclosure have number average molecular weights from about 500 to about 10,000, or any value there between. Some other non-limiting examples of useful polyols include polycarbonate polyols, polycaprolactone polyols, caprolactone, polybutadiene polyols, polysulfide polyols, natural oil polyols derived from castor oil and other vegetable oils, and the like.

The materials forming the elastomeric body may be blended with conventional compounding ingredients including fillers, plasticizers, carbon black, agents to reduce static build up, stabilizers, vulcanization agents/curatives and accelerators, in amounts conventionally employed.

The outer tension section may be formed of, or otherwise contain, any suitable material known to those of skill in the art. In some cases, the outer tension section contains conventional elastomers such as thermoplastic polyurethane ("TPU"), chloroprene rubber ("CR"), acrylonitrile butadiene rubber ("NBR"), hydrogenated NBR ("HNBR"), styrene-butadiene rubber ("SBR"), alkylated chlorosulfonated polyethylene ("ACSM"), epichlorohydrin, butadiene rubber ("BR"), natural rubber ("NR") and ethylene alpha olefin elastomers such as ethylene propylene terpolymer ("EPDM") and ethylene propylene copolymer ("EPM"), or a combination of any two or more of the foregoing.

The opposing continuous tooth section defining an outer surface may be of any suitable structure, pattern or shape. For example, the continuous tooth section may be of such structure, pattern or shape so as to provide timing or synchronous belts, V-belts, multi-V-ribbed or micro-ribbed belts, flat belting and the like.

The tensile reinforcement section disposed between the outer tension section and the cross-linked elastomeric body is useful for providing support and strength to belts. In some embodiments, the tensile reinforcement section contains a plurality of cords aligned longitudinally along the length of main body portion. It should be understood that, in general, any type of tensile reinforcement section known to the art may be utilized. Moreover, any desired material may be used as the tensile members in the tensile reinforcement section, such as cotton, rayon, nylon, polyester, aramid, steel, carbon, PBO, and even discontinuous fibers oriented for low load carrying capability. In some aspects, the cords are embedded in a material, the embedding material being a elastomeric material.

In some aspects of the disclosure, the fabric reinforcement is disposed inwardly adjacent the outer surface of the continuous tooth section, and the fabric reinforcement is enveloped, or otherwise encased or substantially coated, by the cross-linked elastomeric body, which results in the cross-linked elastomeric body forming the outer surface of the continuous tooth section. In some other aspects of the disclosure, the fabric reinforcement is at least partially embedded in the cross-linked elastomeric body, which gives rise to both the cross-linked elastomeric body and fabric reinforcement possibly forming the outer surface of the continuous tooth section. In either case, the fabric reinforcement is based upon any suitable fabric known to those of skill in the art.

The fabric used in embodiments according to the disclosure may be of any suitable design, construction and material, and is utilized and intimately configured along the alternating teeth and land portions of the belt to form a portion of the fabric layer thereon. This fabric may be a nonwoven fabric, or woven fabric, consisting of warp and weft threads laid at any desired angle. In some aspects, the fabric may consist of warp threads held together by spaced pick cords, or of a knitted or braided configuration, and the like. In some embodiments, more than one ply of fabric may be employed. If desired, the fabric may be cut on a bias so that the strands form an angle with the longitudinal direction of travel of a belt in which it is incorporated. The angle may be of any suitable angle, for example, but not limited to 0 or 90 degrees, or any point along the continuum there between.

In some aspects of the disclosure, the fabric used in the fabric layer may be high tenacity acrylic, nylon, aramid, polyester or any other suitable synthetic fiber. In some embodiments, fabric is coated on one side with an alloy of crosslinkable polyethylene and EPDM, or any other suitable crosslinkable elastomer with low friction coefficient to metal and high abrasion resistance, to form a layer, which may also be referred to as a 'fabric layer'. The opposing side is left untreated in some cases, or treated with an adhesive system compatible with polyurethane, which may be cast in the belt. In some aspects of the disclosure, conventional materials including nylon (such as nylon 4, 6, nylon 6, 6 and nylon 6), cotton, polyester, cotton/polyester, nylon/polyester, cotton/nylon, Lycra™ (segmented polyurethane), aramid, rayon and the like, as well as blends thereof, are used as threads of the fabric. In some other aspects, a blend fabric is used based on polyamide wherein at least a substantial portion of the threads in the fabric comprise at least one member of the group consisting of polyether ether ketone (PEEK), polyimide (PI), meta-aramid (M-A), or any combination thereof.

Now referencing FIG. 1, which illustrates a portion of an endless synchronous drive belt in a fragmented perspective view according to one embodiment of the disclosure. Endless synchronous drive belt 100 includes an outer tension section 102 and opposing continuous tooth section 104 defining an outer surface 112. Belt 100 further includes a cross-linked elastomeric body 106, and a tensile reinforcement section 108 disposed between the outer tension section 102 and the cross-linked elastomeric body 106. Belt 100 further includes a fabric reinforcement 110 disposed inwardly adjacent the outer surface of the continuous tooth section 104, as depicted. Fabric reinforcement 110, as shown, is enveloped by the cross-linked elastomeric body

106, thereby having the outer surface 112 of the continuous tooth section 104 formed with the same material as that forming the cross-linked elastomeric body 106; or in other words, the cross-linked elastomeric body 106 is contained within elastomeric body 106.

In some aspects, the cross-linked elastomeric body 106 is based upon a urethane material, formed from the reaction product of a polyisocyanate and a hydroxyl functional polyol which react during a molding process used in forming belt 100. The polyisocyanate and the hydroxyl functional polyol may be injected separately into the belt mold and reacted during the belt molding process. Further, the polyisocyanate and the hydroxyl functional polyol may envelop the fabric reinforcement prior to reacting during the belt molding process; or in some cases during reacting in the belt molding process. Prior to injection, the belt mold typically contains the outer tension section 102, the tensile reinforcement section 108 and the fabric reinforcement 110 prior to injecting the polyisocyanate and the hydroxyl functional polyol.

Figure 2:
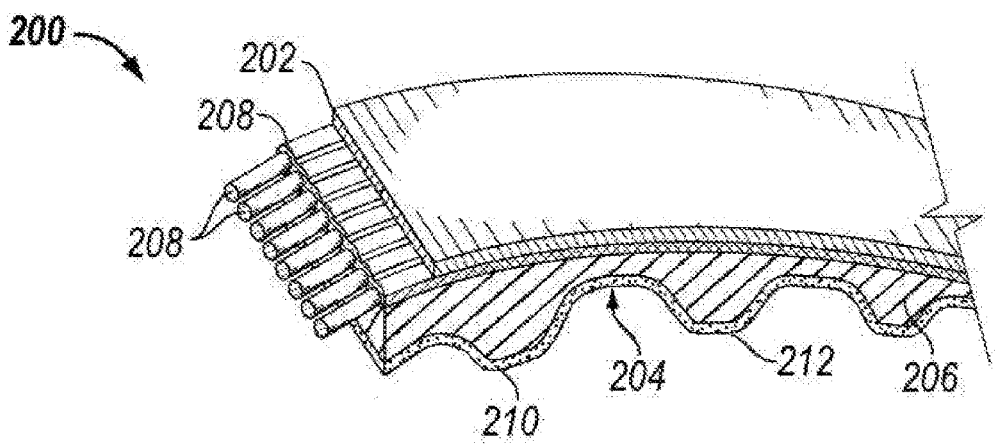

FIG. 2 depicts another embodiment of a synchronous drive belt according to the disclosure. Synchronous drive belt 200 includes an outer tension section 202 and opposing continuous tooth section 204 defining an outer portion 212 of belt 200. A cross-linked elastomeric body 206 based upon a urethane material formed from the reaction product of a polyisocyanate and a hydroxyl functional polyol is disposed between outer tension section 202 and opposing continuous tooth section 204. Further, a tensile reinforcement section 208 is disposed between the outer tension section 202 and the cross-linked elastomeric body 206, and fabric reinforcement 210, which together may form the outer portion of the continuous tooth section 204. The fabric reinforcement 210 is at least partially embedded in the cross-linked elastomeric body 206.

The polyisocyanate and hydroxyl functional polyol forming cross-linked elastomeric body 206 may be reacted during a belt molding process. In some embodiments, the polyisocyanate and the hydroxyl functional polyol are injected into the belt mold and reacted during the belt molding process, where the belt mold contains the outer tension section 202, the tensile reinforcement section 208 and the fabric reinforcement 210 prior to injecting the polyisocyanate and the hydroxyl functional polyol. The at least partial embedment of fabric reinforcement 210 may occur after injection of the polyisocyanate and hydroxyl functional polyol into the mold, and either prior to or during the reaction of the polyisocyanate and hydroxyl functional polyol to form elastomeric body 206.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A synchronous drive belt comprising:
   an outer tension section and opposing continuous tooth section defining an outer surface;
   a cross-linked elastomeric body formed from reactants consisting of a diisocyanate and a hydroxyl functional polyol;
   a tensile reinforcement section disposed between the outer tension section and the cross-linked elastomeric body; and,
   a fabric reinforcement disposed inwardly adjacent the outer surface of the continuous tooth section;
   wherein the polyisocyanate and the hydroxyl functional polyol are injected to be in contact with the outer tension section, the opposing continuous tooth section, the tensile reinforcement section and the fabric reinforcement, wherein the fabric reinforcement is enveloped by the cross-linked elastomeric body, and wherein the cross-linked elastomeric body forms the outer surface of the continuous tooth section.

2. The synchronous drive belt of claim 1, wherein the hydroxyl functional polyol is a hydroxyl functional polyether.

3. The synchronous drive belt of claim 2, wherein the diisocyanate and the hydroxyl functional polyether are reacted during a belt molding process.

4. The synchronous drive belt of claim 3, wherein the diisocyanate and the hydroxyl functional polyether envelop the fabric reinforcement prior to reacting during the belt molding process.

5. The synchronous drive belt of claim 2, wherein the diisocyanate and the hydroxyl functional polyether are subject to a temperature of from about 80° C. to about 100° C. during a belt molding process.

6. The synchronous drive belt of claim 2, wherein the diisocyanate and the hydroxyl functional polyether are injected into a belt mold and reacted during a belt molding process, and wherein the belt mold contains the outer tension section, the tensile reinforcement section and the fabric reinforcement prior to injecting the diisocyanate and the hydroxyl functional polyether.

7. The synchronous drive belt of claim 1, wherein the fabric reinforcement comprises one or more materials selected from cotton, polyester, polyamide, polyacrylic, polyaramid, nylon, polyketone, polyarylene sulfide, hemp, jute or fiberglass.

8. The synchronous drive belt of claim 1, wherein the tensile reinforcement section comprises cords formed from one or more materials selected cotton, rayon, nylon, polyester, aramid, steel, carbon, and poly(p-phenylene-2,6-benzobisoxazole (PBO).

9. The synchronous drive belt of claim 1, wherein the outer tension section comprises one or more materials selected from chloroprene rubber ("CR"), acrylonitrile butadiene rubber ("NBR"), hydrogenated NBR ("HNBR"), styrene-butadiene rubber ("SBR"), alkylated chlorosulfonated polyethylene ("ACSM"), epichlorohydrin, butadiene rubber ("BR"), natural rubber ("NR"), ethylene propylene terpolymer ("EPDM") and ethylene propylene copolymer ("EPM").

10. A synchronous drive belt comprising:
an outer tension section and opposing continuous tooth section defining an outer portion;
a cross-linked elastomeric body formed from reactants consisting of a diisocyanate and a hydroxyl functional polyether;
a tensile reinforcement section disposed between the outer tension section and the cross-linked elastomeric body; and,
a fabric reinforcement as part of the outer portion of the continuous tooth section;
wherein the fabric reinforcement is at least partially embedded in the cross-linked elastomeric body; and,
wherein the diisocyanate and the hydroxyl functional polyether are reacted during a belt molding process.

11. The synchronous drive belt of claim 10, wherein the cross-linked elastomeric body envelops the fabric reinforcement and forms the outer surface of the continuous tooth section.

12. The synchronous drive belt of claim 10, wherein the diisocyanate and the hydroxyl functional polyether are subject to a temperature of from about 80° C. to about 100° C. during a belt molding process.

13. The synchronous drive belt of claim 10, wherein the diisocyanate and the hydroxyl functional polyether are injected into a belt mold and reacted during a belt molding process, and wherein the belt mold contains the outer tension section, the tensile reinforcement section and the fabric reinforcement prior to injecting the diisocyanate and the hydroxyl functional polyether.

14. The synchronous drive belt of claim 10, wherein the fabric reinforcement comprises one or more materials selected from cotton, polyester, polyamide, polyacrylic, polyaramid, nylon, polyketone, polyarylene sulfide, hemp, jute or fiberglass.

15. The synchronous drive belt of claim 10, wherein the tensile reinforcement section comprises cords formed from one or more materials selected cotton, rayon, nylon, polyester, aramid, steel, carbon, and poly(p-phenylene-2,6-benzobisoxazole (PBO).

16. The synchronous drive belt of claim 10, wherein the outer tension section comprises one or more materials selected from chloroprene rubber ("CR"), acrylonitrile butadiene rubber ("NBR"), hydrogenated NBR ("HNBR"), styrene-butadiene rubber ("SBR"), alkylated chlorosulfonated polyethylene ("ACSM"), epichlorohydrin, butadiene rubber ("BR"), natural rubber ("NR"), ethylene propylene terpolymer ("EPDM") and ethylene propylene copolymer ("EPM").

* * * * *